(12) United States Patent
Sautter et al.

(10) Patent No.: US 8,556,146 B2
(45) Date of Patent: Oct. 15, 2013

(54) BOAT RACK

(75) Inventors: Chris Sautter, Portland, OR (US);
James Buckroyd, Portland, OR (US);
Zac Elder, Portland, OR (US); John Mark Elliott, Beaverton, OR (US)

(73) Assignee: Yakima Innovation Development Corporation, Georgetown, Grand Cayman (KY)

( * ) Notice: Subject to any disclaimer, the term of this patent is extended or adjusted under 35 U.S.C. 154(b) by 381 days.

(21) Appl. No.: 12/795,463

(22) Filed: Jun. 7, 2010

(65) Prior Publication Data
US 2011/0139838 A1 Jun. 16, 2011

Related U.S. Application Data

(60) Provisional application No. 61/185,152, filed on Jun. 8, 2009.

(51) Int. Cl.
*B60R 9/04* (2006.01)

(52) U.S. Cl.
USPC ........... 224/564; 224/558; 224/325; 248/615; 248/618; 248/229.12

(58) Field of Classification Search
USPC ................. 224/321, 323–325, 558, 564, 319; 114/381; 410/50; 248/229.12, 499, 248/560, 615, 618, 671
See application file for complete search history.

(56) References Cited

U.S. PATENT DOCUMENTS

| | | | |
|---|---|---|---|
| 1,433,741 | A | 10/1922 | Parker |
| 1,789,458 | A | 1/1931 | Bureau |
| 2,248,170 | A | 7/1941 | Hansen |
| 2,302,300 | A | 11/1942 | Davies |
| 2,444,422 | A | 4/1948 | Bradford |
| 2,536,797 | A | 1/1951 | Cooke |
| 2,551,218 | A | 5/1951 | Menne |
| 2,573,187 | A | 10/1951 | Desilets |
| 2,723,005 | A | 11/1955 | Wink |
| 2,729,499 | A | 1/1956 | Eggum |
| 2,816,672 | A | 12/1957 | Facchini |

(Continued)

FOREIGN PATENT DOCUMENTS

| | | |
|---|---|---|
| DE | 2940095 A1 | 4/1981 |
| DE | 4229268 | 3/1994 |

(Continued)

OTHER PUBLICATIONS

The International Bureau of WIPO, International Search Report and Written Opinion of the International Searching Authority regarding PCT Application No. PCT/US2010/037643, Sep. 8, 2010, 7 pages.

(Continued)

*Primary Examiner* — Nathan J Newhouse
*Assistant Examiner* — John Cogill
(74) *Attorney, Agent, or Firm* — Kolisch Hartwell, P.C.

(57) ABSTRACT

A rack for carrying a boat on top of the vehicle is configured for clamping on a pair of crossbars. Each crossbar has a pair of saddle mounts facing each other on opposite sides of a cradle axis being defined perpendicular to the crossbar and equidistant from each saddle mount. Each saddle mount has a pliable upper platform which is conformable to different boat hull shapes.

9 Claims, 6 Drawing Sheets

(56) References Cited

U.S. PATENT DOCUMENTS

| | | | |
|---|---|---|---|
| 2,988,253 A | 6/1961 | Menghi | |
| 3,001,679 A | 9/1961 | Canning et al. | |
| 3,005,213 A | 10/1961 | Brown et al. | |
| 3,042,240 A | 7/1962 | Cline | |
| 3,113,642 A | 12/1963 | Lay | |
| 3,155,249 A | 11/1964 | Johnson | |
| 3,186,569 A | 6/1965 | Roux | |
| 3,190,587 A | 6/1965 | Fries | |
| 3,276,085 A | 10/1966 | Spranger | |
| 3,460,694 A | 8/1969 | Simms | |
| 3,469,810 A | 9/1969 | Dorris | |
| 3,596,788 A | 8/1971 | Willie | |
| 3,642,157 A | 2/1972 | Williams, Jr. | |
| 3,737,083 A | 6/1973 | Lund | |
| 3,740,034 A | 6/1973 | Scroggins | |
| 3,777,922 A | 12/1973 | Kirchmeyer | |
| 3,826,390 A | 7/1974 | Watson | |
| 3,892,455 A | 7/1975 | Sotolongo | |
| 3,946,917 A | 3/1976 | Crawford et al. | |
| 3,976,213 A | 8/1976 | Ball | |
| 3,993,167 A | 11/1976 | Reed | |
| 4,022,362 A | 5/1977 | Revercomb | |
| 4,023,761 A | 5/1977 | Molis | |
| 4,034,879 A | 7/1977 | Cudmore | |
| 4,058,243 A | 11/1977 | Tappan | |
| 4,081,118 A | 3/1978 | Mason | |
| 4,085,763 A | 4/1978 | Thomas | |
| 4,326,655 A | 4/1982 | Gradek et al. | |
| 4,350,380 A | 9/1982 | Williams | |
| 4,402,442 A * | 9/1983 | Martino | 224/324 |
| 4,589,622 A | 5/1986 | Hutter | |
| 4,630,990 A | 12/1986 | Whiting | |
| 4,717,165 A | 1/1988 | Johnson | |
| 4,751,891 A | 6/1988 | Wilson | |
| 4,817,838 A | 4/1989 | Kamaya | |
| 4,830,249 A | 5/1989 | Mirenda et al. | |
| 4,848,794 A | 7/1989 | Mader et al. | |
| 4,892,279 A | 1/1990 | Lafferty et al. | |
| 4,895,096 A * | 1/1990 | Goodwin et al. | 114/381 |
| 4,960,356 A | 10/1990 | Wrenn | |
| 4,961,524 A | 10/1990 | Hunts | |
| 4,997,332 A | 3/1991 | Johnson | |
| 5,118,020 A | 6/1992 | Piretti | |
| 5,123,147 A | 6/1992 | Blair | |
| 5,131,669 A | 7/1992 | Kinnamon et al. | |
| 5,136,709 A | 8/1992 | Shirakabe et al. | |
| 5,137,195 A | 8/1992 | Walter | |
| 5,215,233 A | 6/1993 | Baldeck | |
| 5,217,149 A | 6/1993 | Simonett | |
| 5,226,570 A | 7/1993 | Pedrini | |
| 5,275,320 A | 1/1994 | Duemmler | |
| 5,346,355 A | 9/1994 | Riemer | |
| 5,360,150 A | 11/1994 | Praz | |
| 5,388,938 A | 2/1995 | Helton | |
| 5,416,957 A | 5/1995 | Renzi, Sr. et al. | |
| 5,442,840 A | 8/1995 | Ewald | |
| 5,516,017 A * | 5/1996 | Arvidsson | 224/310 |
| 5,535,930 A | 7/1996 | Lee | |
| 5,582,044 A | 12/1996 | Bolich | |
| 5,617,617 A | 4/1997 | Gustin | |
| 5,628,336 A | 5/1997 | Lee | |
| 5,647,522 A | 7/1997 | Routh | |
| D386,145 S * | 11/1997 | Staller | D12/412 |
| 5,738,258 A | 4/1998 | Farrow et al. | |
| 5,769,291 A | 6/1998 | Chasan | |
| 5,769,292 A | 6/1998 | Cucheran et al. | |
| 5,775,557 A | 7/1998 | Arvidsson | |
| 5,810,226 A | 9/1998 | Lee | |
| 5,845,828 A | 12/1998 | Settelmayer | |
| 5,868,621 A | 2/1999 | Parsons | |
| 5,951,231 A | 9/1999 | Allen | |
| 5,992,805 A | 11/1999 | Tanner | |
| 6,015,074 A | 1/2000 | Snavely et al. | |
| 6,131,781 A | 10/2000 | Murray | |
| 6,164,507 A * | 12/2000 | Dean et al. | 224/324 |
| 6,189,868 B1 | 2/2001 | Santelli, Jr. | |
| 6,357,643 B1 | 3/2002 | Janner et al. | |
| 6,385,822 B1 | 5/2002 | Dean et al. | |
| 6,422,441 B1 | 7/2002 | Settelmayer et al. | |
| 6,622,898 B1 | 9/2003 | Wang | |
| 6,681,971 B2 | 1/2004 | Laverack et al. | |
| 6,715,653 B2 * | 4/2004 | DeCosta | 224/324 |
| 6,793,186 B2 | 9/2004 | Pedersen | |
| 6,918,521 B2 | 7/2005 | Settelmayer et al. | |
| 7,036,698 B2 * | 5/2006 | Allen | 224/310 |
| 7,131,561 B2 * | 11/2006 | Humes | 224/319 |
| 7,357,283 B2 * | 4/2008 | Settelmayer | 224/322 |
| 8,021,169 B1 | 9/2011 | Smith | |
| 8,136,709 B2 | 3/2012 | Jeli et al. | |
| 8,245,893 B2 | 8/2012 | Sautter et al. | |
| 2002/0125282 A1 | 9/2002 | Laverack et al. | |
| 2005/0077335 A1 | 4/2005 | Bourne | |
| 2006/0273122 A1 | 12/2006 | Bogoslofski et al. | |
| 2006/0289577 A1 | 12/2006 | Malone | |
| 2007/0119888 A1* | 5/2007 | Chuang | 224/427 |
| 2008/0000940 A1* | 1/2008 | Wang | 224/319 |
| 2008/0029563 A1 | 2/2008 | Malone | |
| 2011/0132946 A1 | 6/2011 | Sautter et al. | |

FOREIGN PATENT DOCUMENTS

| | | |
|---|---|---|
| DE | 20309766 U1 | 10/2003 |
| EP | 0019873 B1 | 10/1982 |
| EP | 0511179 A1 | 10/1992 |
| FR | 1400231 | 4/1965 |
| FR | 2481209 | 10/1981 |
| FR | 2501601 A1 | 9/1982 |
| FR | 2519305 | 7/1983 |
| FR | 2624808 | 12/1987 |
| FR | 2600953 A1 | 1/1988 |
| GB | 886743 A | 1/1962 |
| GB | 2257463 | 1/1993 |
| WO | WO2005021332 | 3/2005 |
| WO | WO2010144369 A1 | 12/2010 |

OTHER PUBLICATIONS

The International Bureau of WIPO, International Preliminary Report on Patentability regarding PCT Application No. PCT/US2010/037643, Dec. 22, 2011, 7 pages.

US Patent and Trademark Office, Office Action regarding U.S. Appl. No. 12/816,121, Nov. 2, 2012, 13 pages.

* cited by examiner

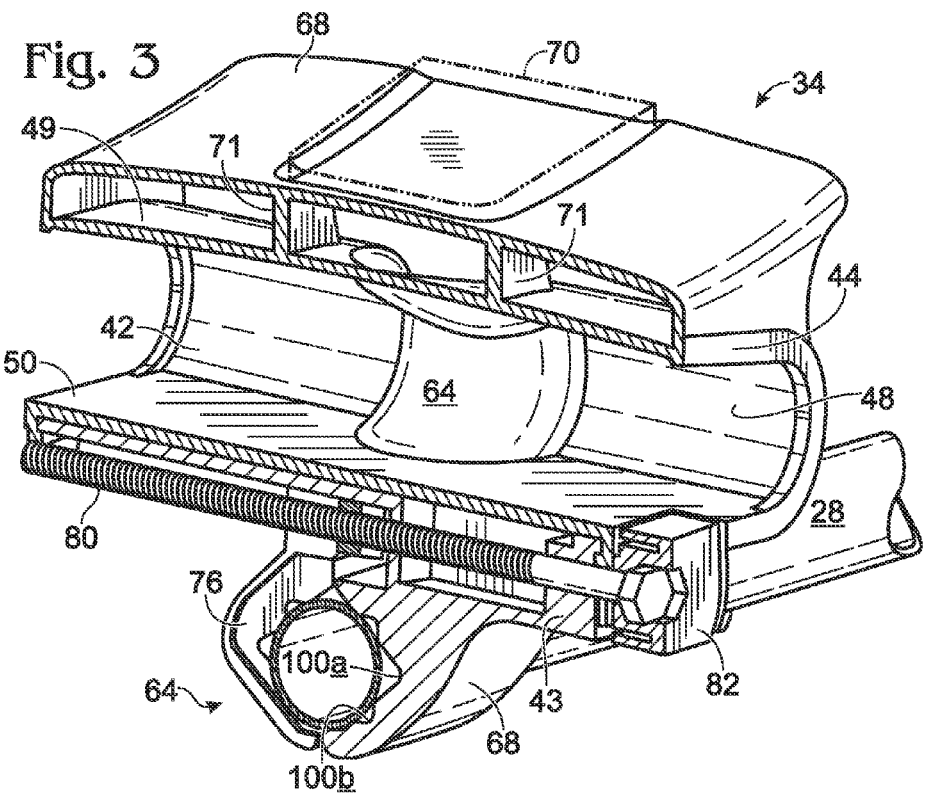
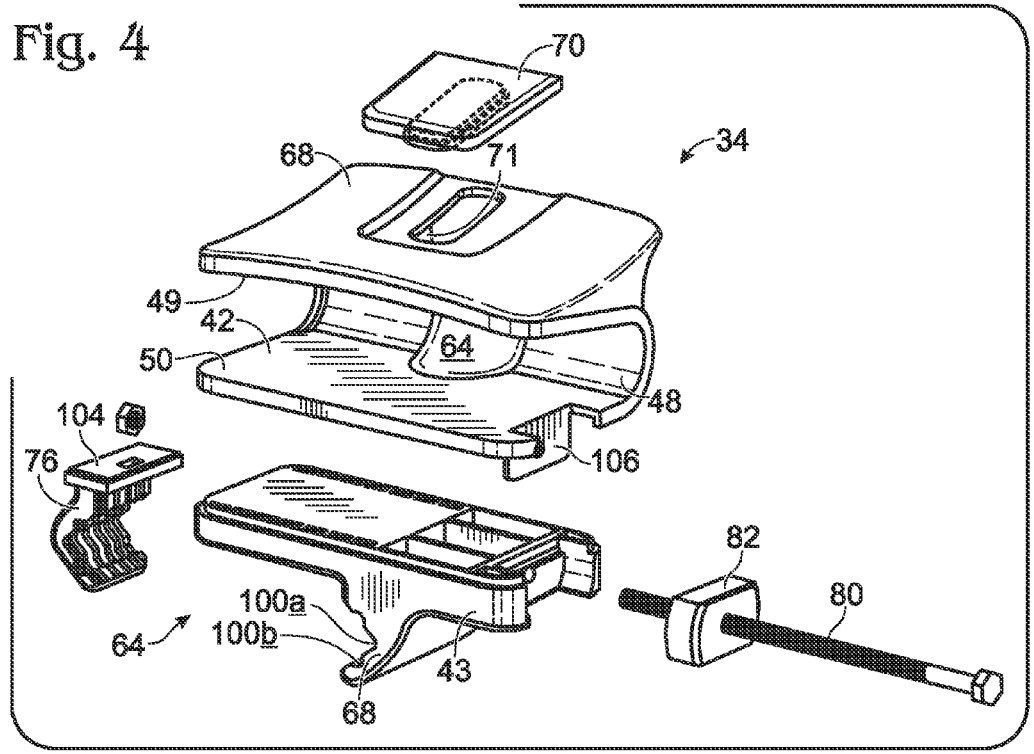

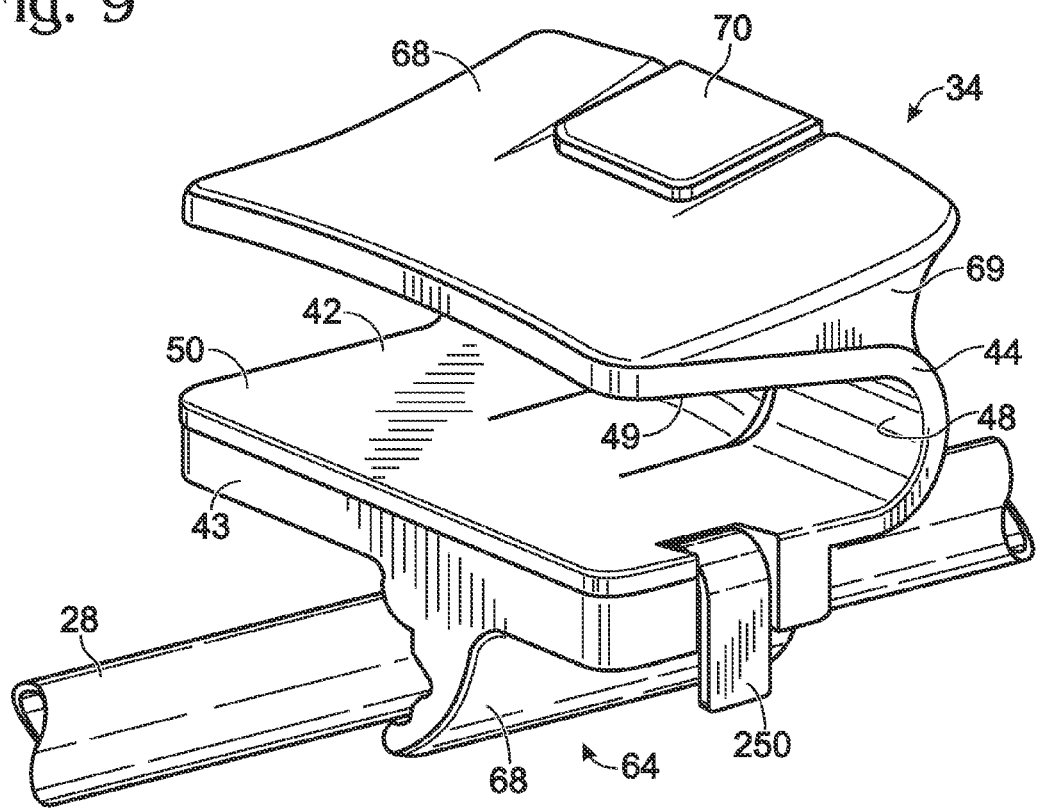

BOAT RACK

CROSS-REFERENCE TO RELATED APPLICATION

This application claims priority from U.S. Provisional Patent Application Ser. No. 61/185,152, filed Jun. 8, 2009 which is incorporated herein by reference. This application also incorporates by reference each of the following U.S. Patents in their entireties: U.S. Pat. No. 6,385,822, U.S. Pat. No. 7,131,561, and U.S. Pat. No. 5,516,017.

BACKGROUND

Boats such as kayaks and canoes often are secured to vehicles. For example, one or more boat saddles may be mounted to a vehicle roof rack. A boat may be placed on top of and secured to the boat saddle using straps or other similar means. Roof racks for boats are desirable because they avoid the need for a trailer, and also do not obstruct or hinder access to the vehicle through any of the vehicle's doors. There are many types of boats having various hull shapes and sizes which are generally appropriate for being transported on top of a vehicle roof rack. Thus, there is a need for vehicle roof racks that are capable of receiving boat hulls of various shapes and sizes without damaging the boat or requiring substantial readjustment of multiple components.

SUMMARY

A rack for carrying a boat on top of a vehicle includes plural saddle mounts having clamps for securing the saddle mounts on a pair of crossbars. Each saddle mount has a contact surface or platform configured to change its orientation in conformance with the shape or contour of a particular boat hull.

BRIEF DESCRIPTION OF THE DRAWINGS

FIG. 3 is a sectional perspective view of a saddle mount, as shown in FIG. 2.

FIG. 4 is an exploded perspective view of a saddle mount, as shown in FIG. 2.

FIG. 9 is a perspective elevation view of an alternative saddle mount embodiment.

DETAILED DESCRIPTION

Vehicle roof racks are desirable for carrying many different kinds of cargo including boats. Vehicle roof racks avoid the need for a trailer. Roof racks also are attractive because they do not interfere with access to the interior of a vehicle. The description below refers to the figures and particular details of preferred boat rack embodiments. However, it will be apparent from the following description and claims that numerous variations and modifications of the illustrated designs are contemplated and supported by this disclosure.

Figure 1:
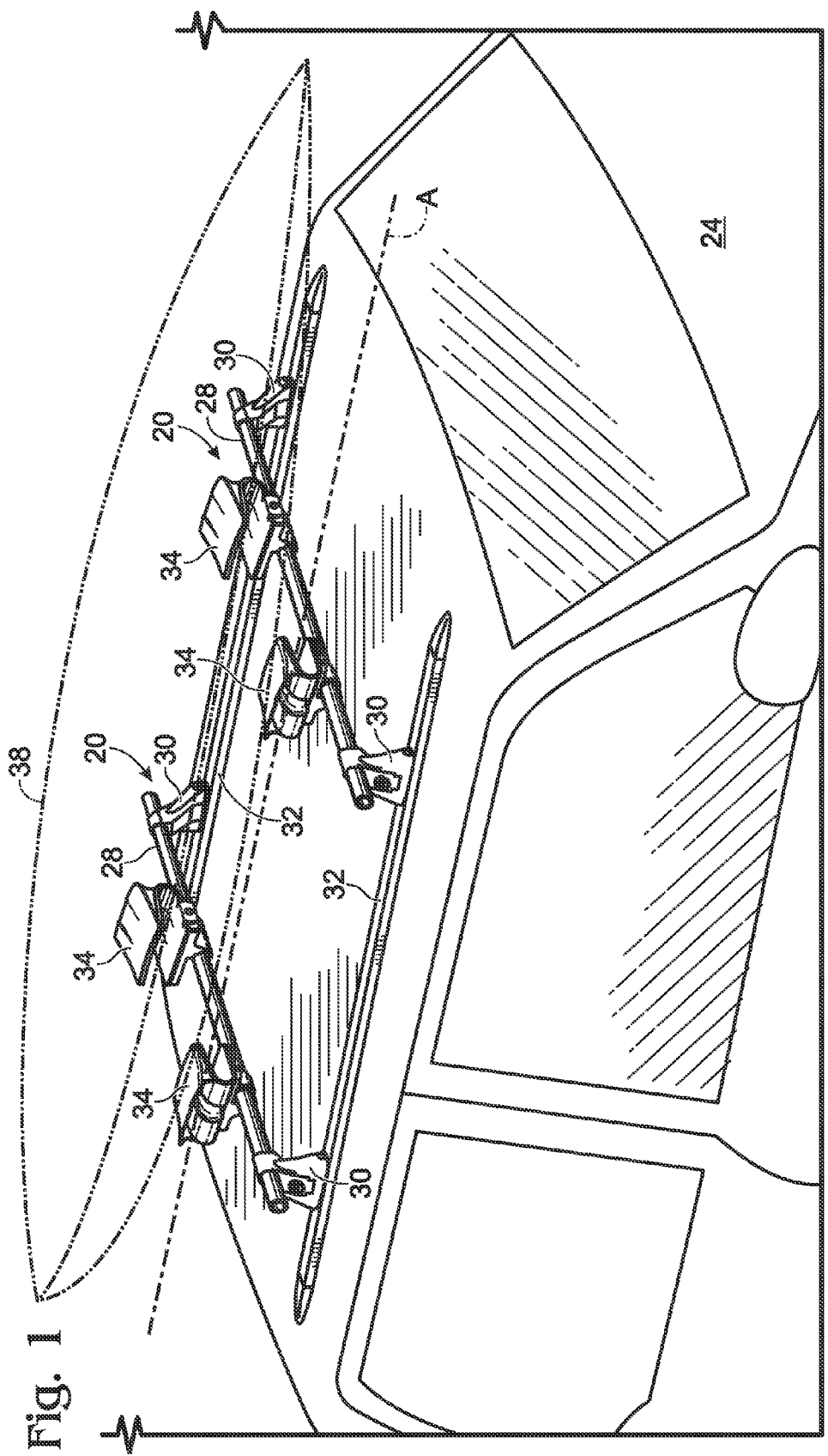
FIG. 1 is a perspective view of a rack mounted on top of a vehicle for carrying a boat.

FIG. 1 shows rack 20 mounted on top of vehicle 24. Rack 20 includes crossbars 28 mounted on vehicle 24 via towers 30. Each tower 30 secures one end portion of crossbar 28 to rail 32 provided on top of vehicle 24. Each crossbar 28 supports a pair of saddle mounts 34 for supporting the hull of boat 38. As shown in FIG. 1, axis A defines an elongate axis parallel to the direction of travel for vehicle 24. Axis A is perpendicular to crossbars 28. Axis A is equidistant from each of saddle mounts 34. Axis A may be referred to as a cradle axis.

Figure 2:
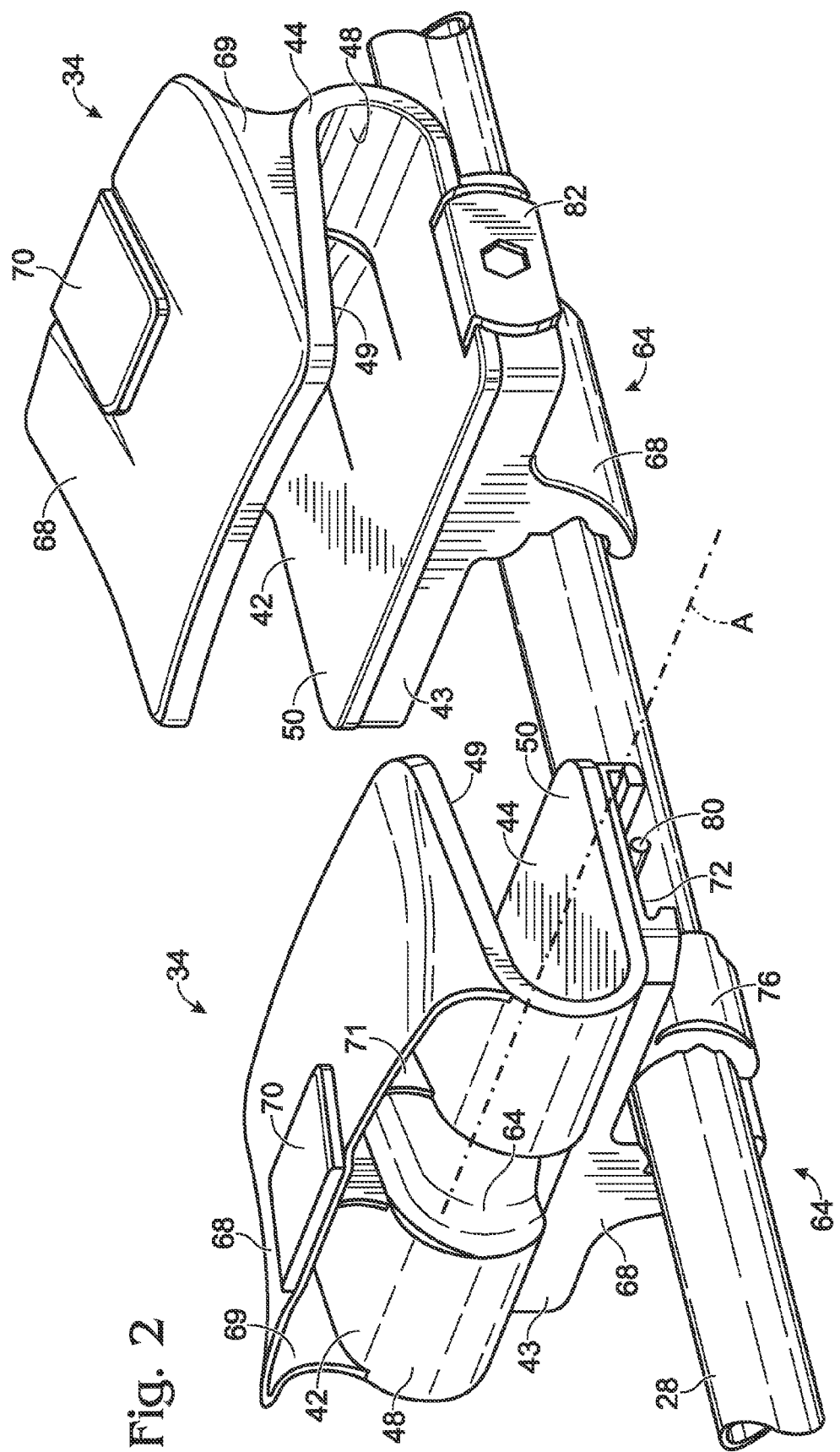
FIG. 2 is a perspective view of a pair of saddle mounts for supporting the hull of a boat.

FIG. 2 shows a pair of saddle mounts 34 mounted on crossbar 28 equidistant from axis A. Each of saddle mounts 34 are, preferably, constructed substantially identically to provide simplicity and efficiency in manufacturing and assembly. Saddle mounts 34 may be mounted facing each other simply by orienting the clamp handles on opposite sides of the crossbar, as shown.

As shown in FIG. 2, each saddle mount 34 includes a single piece C-shaped portion or support member 42 mounted on base 43. In a preferred example, C-shaped portion 42 has a thickness in a range of approximately 0.025-inches to 0.225-inches, or more specifically, 0.125-inches. C-shaped portion 42 also may have side walls 44 which are somewhat thicker, for example, 0.25-inches. C-shaped portion 42 includes curved middle region 48 which may have a diameter in the range of 0.5-inches to 2.5-inches, or more specifically, for example, 1.3-inches. Curved middle region 48 connects upper platform portion 49 to floor expanse 50 of C-shaped portion 42. Floor expanse 50 is secured to base 43.

C-shaped portion 42 may have one or more stiffening ribs or dents 64 for strengthening saddle mount 34 and/or resisting various forces applied by a boat hull. Wing expanse 68 is connected to the top side of upper platform portion 49 of C-shaped portion 42. Wing expanse 68 has side walls 69 forming a three-sided, open-ended, diaphragm for gripping, adapting, conforming, cushioning, and/or supporting the hull of a boat. Wing expanse 68 has a recessed area on the top surface which holds frictional pad 70, for example, made of rubber, for frictionally gripping the outer surface of a boat hull. In a preferred embodiment, the elastomeric pad 70 is made of Dynaflex G2709 which has a 53 shore A durometer specification. Wing expanse 68 also may have internal stiffening ribs 71 connecting wing expanse 68 to upper platform portion 49.

In a preferred embodiment, C-shaped portion 42 is made of plastic comprising unfilled Nylon 6/6 which allows the mount to flex without cracking. The C channel or gap may collapse so that the tips of the C are touching for a steeped-bottom boat (approximately 20 degrees of flex). In contrast, the C structure may also open up for a flat-bottom boat (approximately 9 degrees of flex). Youngs Modulus is about 160,000 PSI. The yield strength of the material is approximately 6000 PSI. Base 43 is preferably made of glass-filled nylon for stiffness and structure.

Each saddle mount 34 includes clamps 64 for securing C-shaped portion 42 to crossbar 28. Base 43 includes stationary or fixed jaw 68 descending downward from a side of base 43 opposite from the top side to which C-shaped portion 42 is attached. Base 43 has internal track 72 for retaining and guiding sliding jaw member 76. Threaded bolt or screw shaft 80 engages sliding jaw member 76. Rotation of bolt 80 causes sliding jaw member 76 to move, alternately, back and forth, toward and away, from stationary jaw 68, along a path parallel to axis A, and perpendicular to crossbar 28. Handle 82 is attached to bolt 80 for manually turning bolt 80. Handle 82 may be a knob or other device configured for twisting or rotating to cause rotation of shaft 80 resulting in translation of sliding jaw member 76. Alternatively, handle 82 may be replaced by a cam lever configured to screw and/or pivot causing movement of sliding jaw member 76 (FIG. 9).

FIG. 3 shows a cross-sectional view of saddle mount 34 mounted on crossbar 28. Clamp 64 includes stationary jaw 68 and sliding jaw 76 for cooperatively clamping crossbar 28. Each of the jaws, as shown, have internal notches or grooves 100*a*, 100*b* for adapting to crossbars of different shapes, as explained in more detail below. Stationary jaw portion 68 is integrally formed with or from base 43. Bolt 80 extends through base 43, and is engaged with a threaded aperture in sliding jaw member 76. Handle 82 is provided for rotating bolt 80, thereby causing sliding jaw member 76 to move alternately, toward and away from stationary jaw portion 68. As explained above, a different type of actuator handle, for example, a pivoting cam lever may also be used. Floor expanse 50 of C-shaped support 42 is fastened to base 43. Floor expanse 50 is connected to curved middle region 48, which in turn is connected to upper platform portion 44. Upper platform portion 44 is cantilevered inward toward axis A (cradle axis) and the other saddle mount, as shown in FIG. 2. Wing expanse 68 has side walls 70 creating a three-sided open-ended diaphragm for interfacing with a boat hull.

FIG. 4 shows an exploded view of saddle mount 34 with most of the structures numbered the same as in FIGS. 2 and 3. Clamp 64 includes base 43 and stationary jaw portion 68. Sliding jaw member 76 has upper plate portion 104 which slides in internal track 72 (see FIG. 2) of base 43. Bolt 80 and handle 82 are operable for controlling sliding movement of jaw member 76. C-shaped support 42 includes flange 106. Flange 106 has a hole for receiving bolt 80 and securing floor expanse 50 onto base 43. Other structure shown in FIG. 4 are the same as already described above.

Figure 5:
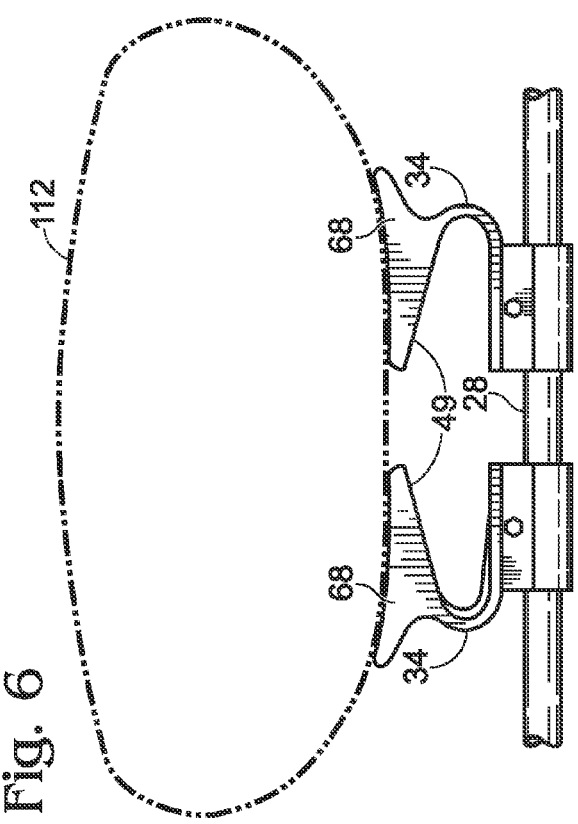
FIGS. 5 and 6 are front elevation views of a pair of saddle mounts adapting to support boat hulls of different shapes.
Figure 6:
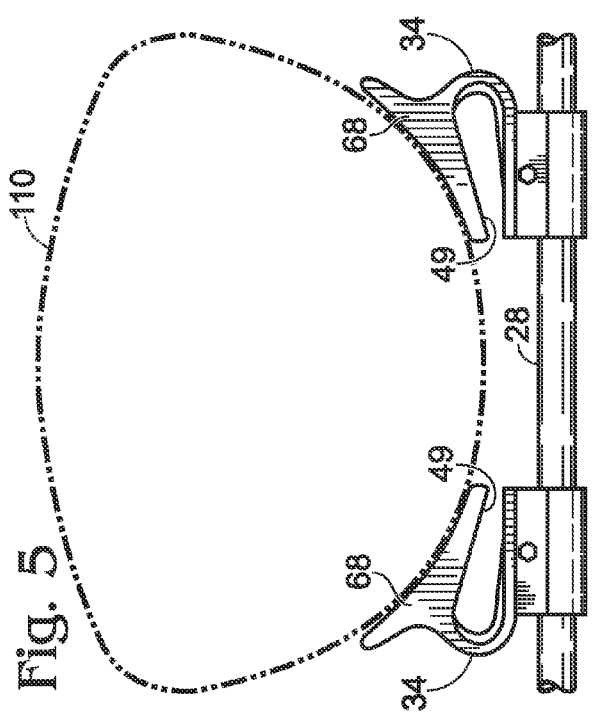

FIGS. 5 and 6 show how cantilevered upper platforms 49 adapt to conform to different hull shapes. In FIG. 5, upper platforms 49 and wing expanses 68 tip inward to support a relatively rounded hull shape of boat 110. In contrast, FIG. 6 shows upper platforms 49 and wing expanses 68 tipping or rotating outwardly to support a relatively flat hull portion 112 of a boat. The adaptability of the saddle mounts, as illustrated in FIGS. 5 and 6, enable the boat rack to accommodate or fit a wider range of hull shapes compared to prior boat racks. Further, the single piece construction, of at least the C-shape support, allows a simpler, more efficient, construction for an adaptable top-of-vehicle boat rack. The boat contact surface (saddle) is preferably made of unfilled resin (nylon or polypropylene) for flexibility. As shown, it may have a C-shape structure to provide automatic angular compliance and a thin flexible top surface to provide additional surface compliance. The combination of compliant structures allows the boat contact surface to conform to the shape of the boat and minimize hull deformation.

In FIG. 5 each saddle is bent down to accommodate steep sides of a hull. In contrast, FIG. 6 shows saddles bent up for accommodating a flat bottom of a hull. The shape of the saddle and position of the features provide the desired compliance. The C-shape structure has a stiffening dent as shown in the figures described above. The stiffening dent may be sized and shaped to give the desired spring stiffness to the C-shaped structure. The top surface is supported on three sides and thin enough to be flexible. The top surface may be domed slightly to add additional stiffness. These features allow the top surface to act as a diaphragm and to comply to the boat surface. The top surface sticks out to form a wing behind the C-shaped structure which allows the saddle to flatten out when under a flat bottom boat.

Figure 7:
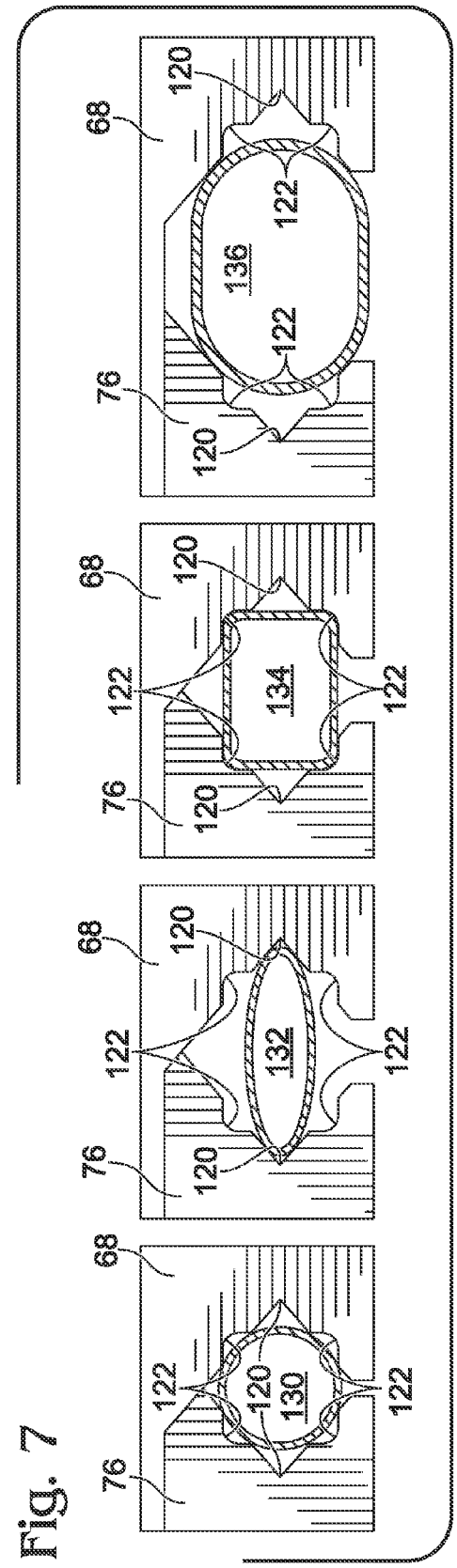
FIG. 7 is a series of partial sectional views of a clamp adapting to crossbars of different shapes.

FIG. 7 shows how jaw portions 68, 76 adapt to grip crossbars of different shapes. For this purpose, angled notches 120 and curved notches 122, are provided on the internal surfaces of jaws 68 and 76. The first view shows jaws 68 and 76 clamped on circular crossbar 130. In the second view, jaws 68 and 76 are clamped on oval- or elliptically-shaped crossbar 132. The tips of the elliptical shape are received in angled notches 122. The third view shows jaws 68 and 76 clamped on a rectangularly-shaped crossbar 134. The corners of the crossbar shape are received in curved notches 122. The fourth view shows jaws 68 and 76 clamped on oval crossbar 136. In both the first and the fourth view, i.e., circular and oval crossbar shapes, the bar contacts shoulder-like projections on the inside of the jaws between or around the notches.

The direction of reciprocating motion of sliding jaw or claw 76 may be referred to as a "horizontal" direction, which basically means it is perpendicular to the gravitational direction which is considered "vertical". Both of the "horizontal" and "vertical" directions are considered to be linear directions in contrast to curved, or angular directions.

Figure 8:
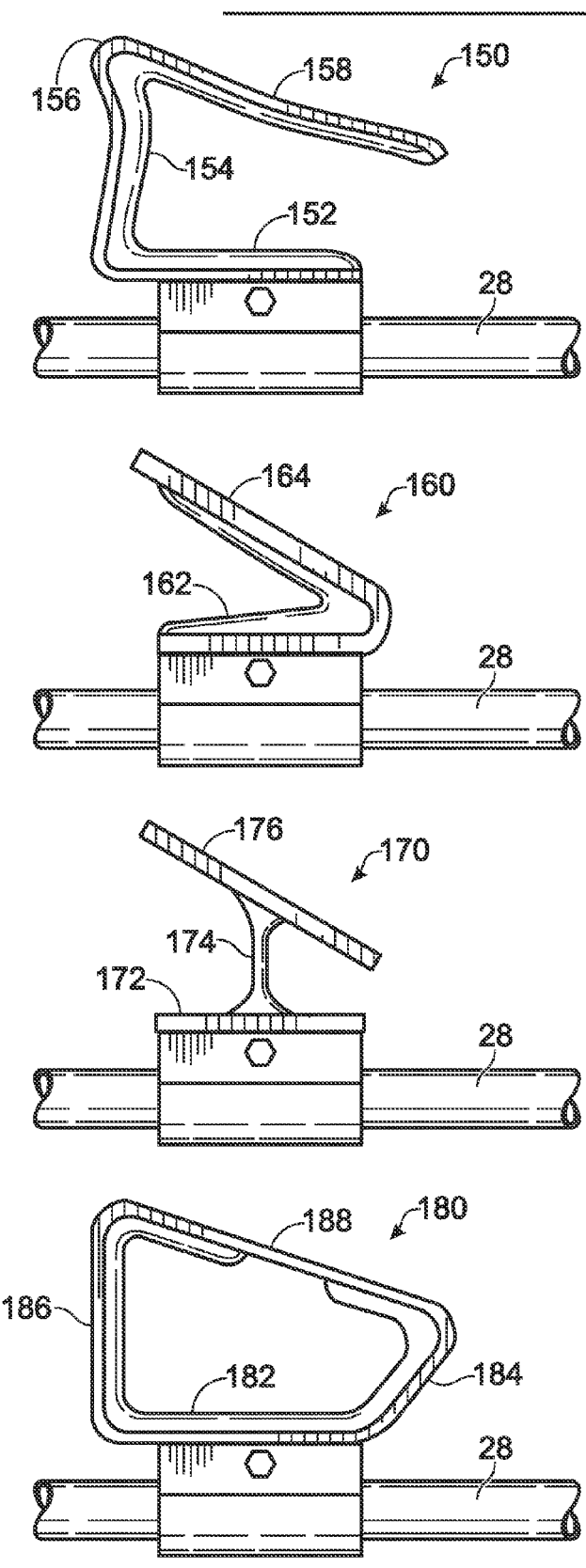
FIG. 8 shows a series of front elevation views of alternative saddle mount configurations.

FIG. 8 shows a series of four alternative saddle mounts. In each of the drawings in FIG. 8, the saddle mount is configured to face a similar or identical saddle mount to the right of the figure for cooperatively cradling and/or supporting a boat, also positioned generally to the right of the figure.

In the first drawing of FIG. 8, a tubular structure has supports at both the low and the high edge with a flexible boat contact surface suspended between. Saddle mount 150 includes floor expanse 152 connected to vertical panel 154. Vertical panel 154 makes a slightly hairpin turn 156 into upper platform 158 for interfacing a boat hull.

In the second drawing of FIG. 8, a T-structure uses a larger support in the middle with a flexible boat contact surface radiating outward. Saddle mount 160 includes floor expanse 162 which turns acutely into upper platform 164 for supporting a boat hull.

In the third drawing of FIG. 8, a V-structure includes a support at the low edge with a stiffer boat contact surface pointed up at an angle. Floor expanse 172 is connected to vertical trunk support 174. Trunk 174 supports a middle portion of upper platform 176 at an inwardly angled orientation for supporting a boat hull.

In the fourth drawing of FIG. 8, a C-structure uses support at the high edge with a stiffer boat contact surface pointed down at an angle. Floor expanse 182 is connected on one end to vertical panel 186, and at the other end to obtusely angled panel 184. Vertical and angled panels 186 and 184 support upper platform 188 which is configured for interfacing a boat hull.

FIG. 9 shows a variation of the saddle mount of FIGS. 2-4. Instead of screw handle 82, a quick-release-style cam lever 250 is provided for actuating movement of sliding jaw 76.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A rack for carrying a boat on top of a vehicle having an elongate axis parallel to the direction of vehicular travel comprising
   a crossbar and a pair of towers configured to mount the crossbar on top of a vehicle, the crossbar being substantially perpendicular to the elongate axis, and
   a pair of saddle devices mounted on the crossbar facing each other, and configured to cooperatively cradle a boat hull, a cradle axis being defined perpendicular to the crossbar and equidistant from each saddle device, each saddle device having a C-shaped portion having an open side facing the cradle axis, each C-shaped portion including a lower platform portion, an upper platform portion, and a connecting portion extending from the lower platform portion to the upper platform portion opposite the open side, the upper platform portion being cantilevered inward toward the cradle axis from the connecting portion,
   wherein each upper platform portion is connected to a wing expanse angled upward away from the cradle axis, and wherein each wing expanse has side walls connected to the respective upper platform portion creating a diaphragm having an open side opposite from the open side of the respective C-shaped portion.

2. The rack of claim 1, wherein each saddle device includes an adjustable clamp for securing the saddle device on to a crossbar.

3. The rack of claim 2, wherein each clamp has a pair of jaws and a screw device configured to adjust one of the jaws toward the other along a linear path parallel to the cradle axis.

4. The rack of claim 1, wherein the connecting portion is curved and has a stiffening dent.

5. The rack of claim 1, wherein the open side is a first open side, and wherein each C-shaped portion also has a second open side and a third open side each disposed adjacent the first open side and the connecting portion and spaced from each other along an axis parallel to the cradle axis.

6. A rack for carrying a boat on top of a vehicle having an elongate axis parallel to the direction of vehicular travel comprising
   a crossbar and a pair of towers configured to mount the crossbar on top of a vehicle, the crossbar being substantially perpendicular to the elongate axis,
   a pair of saddle devices mounted on the crossbar facing each other, and configured to cooperatively cradle a boat hull, a cradle axis being defined perpendicular to the crossbar equidistant from each saddle device, each saddle device having a C-shaped portion having an open side facing the cradle axis, each C-shaped portion having an upper platform portion cantilevered inward toward the cradle axis, and a lower platform portion having a bottom side, each lower platform portion having a fixed jaw projecting from the bottom side, a sliding jaw member, and an adjustment mechanism operable to urge the sliding jaw member along a linear path to change the distance between the fixed jaw and the sliding jaw member,
   wherein each upper platform portion is connected to a wing expanse angled upward away from the cradle axis, and wherein each wing expanse has side walls connected to the respective upper platform creating a diaphragm having an open side opposite from the open side of the respective C-shaped portion.

7. The rack of claim 6 wherein the adjustment mechanism includes a threaded bolt connected to the sliding jaw member for adjusting the distance between the fixed jaw and the sliding jaw member.

8. The rack of claim 6 wherein the adjustment mechanism includes a pivoting cam device connected to the sliding jaw member for adjusting the distance between the fixed jaw and the sliding jaw member.

9. The rack of claim 6, wherein each C-shaped portion has a curved middle region, and a stiffening dent in the middle region.

* * * * *